(12) United States Patent
Pancotti et al.

(10) Patent No.: US 8,141,821 B1
(45) Date of Patent: Mar. 27, 2012

(54) AIRCRAFT

(75) Inventors: Santino Pancotti, Gallarate (IT); Dante Ballerio, Caronno Varesino (IT); Fabio Nannoni, Novara (IT)

(73) Assignee: Agusta S.p.A., Samarate (IT)

(*) Notice: Subject to any disclaimer, the term of this patent is extended or adjusted under 35 U.S.C. 154(b) by 372 days.

(21) Appl. No.: 12/580,928

(22) Filed: Oct. 16, 2009

(30) Foreign Application Priority Data

Oct. 21, 2008 (EP) ..................................... 08425679

(51) Int. Cl.
*B64C 1/14* (2006.01)
(52) U.S. Cl. ............... 244/129.5; 244/118.1; 244/137.1; 244/17.11
(58) Field of Classification Search ............... 244/129.5, 244/129.4, 118.1, 137.1, 7 A, 6, 17.11; 49/130
See application file for complete search history.

(56) References Cited

U.S. PATENT DOCUMENTS

| | | | |
|---|---|---|---|
| 3,147,942 A * | 9/1964 | Griffith | 244/118.3 |
| 3,424,411 A * | 1/1969 | Blunschi, Sr. et al. | 244/137.1 |
| 5,259,576 A | 11/1993 | Howard | |
| 6,189,833 B1 | 2/2001 | Ambrose et al. | |
| 6,474,600 B1 * | 11/2002 | Apps | 244/137.1 |
| 7,275,717 B2 * | 10/2007 | Landry | 244/129.5 |
| 2010/0059628 A1 * | 3/2010 | Kobayashi et al. | 244/129.5 |

FOREIGN PATENT DOCUMENTS

| | | |
|---|---|---|
| EP | 0581626 | 2/1994 |
| GB | 1054842 | 1/1967 |
| WO | WO 92/13757 | 8/1992 |
| WO | WO 2006/124111 | 11/2006 |

OTHER PUBLICATIONS

Search Report in European Application No. 08425679.1 dated Mar. 26, 2009.

* cited by examiner

*Primary Examiner* — Christopher P Ellis
(74) *Attorney, Agent, or Firm* — McCraken & Frank LLC

(57) ABSTRACT

An aircraft capable of hovering, and having a fuselage in turn having a nose, a tail portion at the opposite end to the nose, and a cabin interposed between the nose and the tail portion; the cabin has a loading opening at the opposite end to the nose, and a first wall movable between a closed position engaging at least one portion of the loading opening, and an open position allowing free access to the portion of the loading opening; and, working from the tail portion towards the nose, the first wall in the open position extends on the opposite side of a first edge of the loading opening with respect to a second edge, opposite the first edge, of the loading opening.

13 Claims, 3 Drawing Sheets

AIRCRAFT

BACKGROUND OF THE INVENTION

Helicopters are known substantially comprising a fuselage housing a cabin; and a main rotor projecting from the top of the fuselage.

The cabin is normally occupied by the crew and various material, and, in the case of a casualty transport helicopter, is also used for transporting stretchers.

More specifically, the fuselage comprises a nose located at the front in the normal flying direction of the helicopter; one or more cabin access openings on one or both sides of the helicopter; and a rear cabin loading opening for loading stretchers and/or other material into the cabin.

The helicopter also comprises a rear hatch movable between a first position engaging the rear opening, and a second position allowing free access to the rear opening to load/unload stretchers and/or other material.

Some known helicopters comprise a rear hatch hinged to one edge of the loading opening to move between the first and second position.

More specifically, the rear hatch of medium/small helicopters is hinged to a lateral edge of the loading opening, and swings sideways of the loading opening and outwards of the cabin between the first and second position.

The rear hatch of medium-size helicopters is hinged to a bottom edge of the loading opening, swings frontwards of the loading opening and outwards of the cabin between the first and second position, and, once in the second position, forms a loading ramp for stretchers and/or other material for loading.

Hinged hatches clutter up the loading area adjacent to the rear loading opening of the helicopter.

This therefore obstructs loading of stretchers or other material, especially if the main rotor of the helicopter is running.

A need is felt within the industry to keep the loading area in front of the rear loading opening as clear as possible, to allow troublefree loading of stretchers and/or other material, especially when the main rotor is running.

SUMMARY OF THE INVENTION

It is an object of the present invention to provide an aircraft designed to achieve this cheaply and easily.

According to the present invention, there is provided an aircraft as claimed in the attached claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
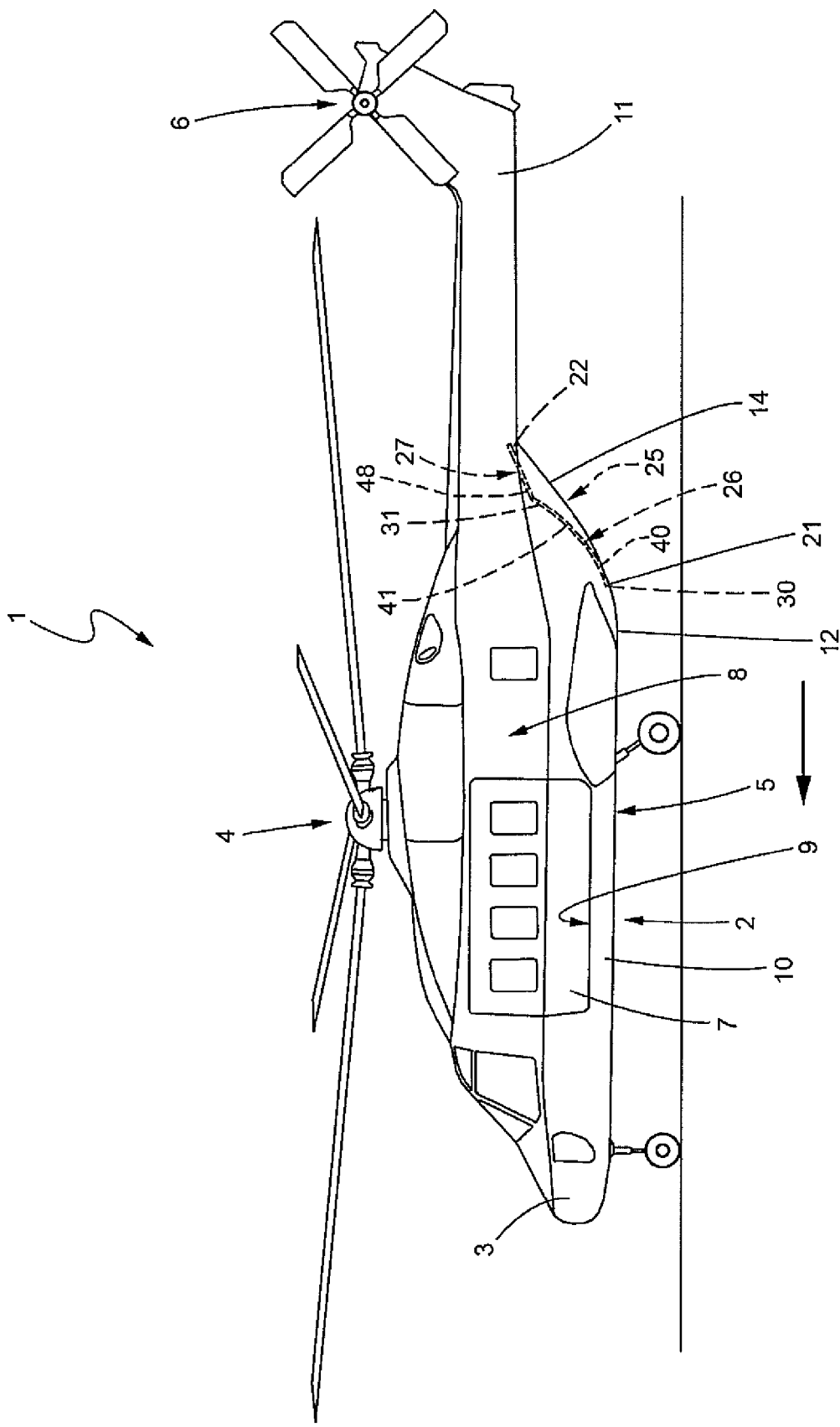
FIG. 1 shows a side view of a helicopter in accordance with the present invention.

With reference to the accompanying drawings, number 1 indicates an aircraft capable of hovering, i.e. remaining aloft at fixed altitude and zero speed.

In the example shown, aircraft 1 is a helicopter.

Alternatively, aircraft 1 may be a convertiplane.

The terms "front", "rear", "top", "bottom", "lateral" and similar used in the following description are in no way limiting, and serve solely for the sake of clarity with reference to the position of the helicopter in FIG. 1.

The helicopter substantially comprises a fuselage 2, a main rotor 4, and a tail rotor 6.

More specifically, fuselage 2 comprises a main portion 5 fitted on top with main rotor 4, and defining a cabin 8, a nose 3, and a tail portion 11 located at the opposite end of main portion 5 to nose 3, and from which tail rotor 6 projects.

Cabin 8 houses the crew and possibly freight and/or a stretcher and casualty.

Main portion 5 of fuselage 2 also comprises a lateral opening 9, for access to cabin 8, formed in one side 10 of cabin 8; and a side hatch 7 movable between a closed position (FIG. 1) engaging lateral opening 9, and an open position (not shown) allowing free access to opening 9.

Tail portion 11 is supported by a tail beam 13 forming part of a supporting frame of fuselage 2 and positioned substantially horizontally with reference to the FIG. 1 configuration.

Main portion 5 also comprises a region 12 supporting cabin 8 on the opposite side to main rotor 4; and a region 14 sloping with respect to region 12 and tail beam 13.

Region 14 defines a rear loading opening 20 (FIGS. 2 to 5) of cabin 8, defining cabin 8 on the opposite side to nose 3.

More specifically, loading opening 20 is defined by two opposite, parallel edges 21, 22, and by two opposite edges 23, 24 interposed between respective ends of edges 21, 22.

Edges 21, 22 define the bottom and top of loading opening 20 respectively.

The helicopter also comprises a rear hatch 25 in turn comprising a bottom wall 26 and a top wall 27.

Walls 26, 27 are movable between respective closed positions (FIGS. 2 and 4) engaging respective portions 28, 29 of loading opening 20, and respective open positions (FIGS. 3 and 5) allowing free access to portions 28, 29 of loading opening 20.

More specifically, portion 28 is bounded at the bottom by edge 21 and laterally by the bottom portions of edges 23, 24; and portion 29 is bounded at the top by edge 22 and laterally by the top portions of edges 23, 24.

Working from tail portion 11 towards nose 3, wall 26 in the open position advantageously extends completely on the opposite side of edge 21 with respect to edge 22.

In the open position, wall 26 also at least partly faces an outer surface 38 of region 12 defining edge 21 of loading opening 20.

More specifically, walls 26, 27 are quadrilateral in shape.

Wall 26 is bounded by two opposite parallel edges 30, 31, and by two opposite edges 32, 33 extending between respective ends of edges 30, 31.

Edges 30, 31 define the bottom and top of wall 26 respectively.

Wall 26 comprises a convex face 40 facing outwards of cabin 8; and a concave face 41 facing inwards of cabin 8.

When wall 26 is in the open position, face 41 faces surface 38, which is convex.

More specifically, when wall 26 is in the open position, outer surface 38 occupies the cavity of face 41.

The convex and concave curvatures of faces 40, 41 match the convex curvature of outer surface 38, so that, when wall 26 is in the open position, points on faces 40, 41 are substantially located at respective constant distances from the corresponding points on surface 38.

Wall 26 is mounted to slide with respect to edge 21 between the open and closed positions.

More specifically, when wall 26 is in the closed position, edge 30 cooperates with edge 21 of loading opening 20, and edge 31 is interposed between edges 21 and 22 of loading opening 20.

Figure 5:
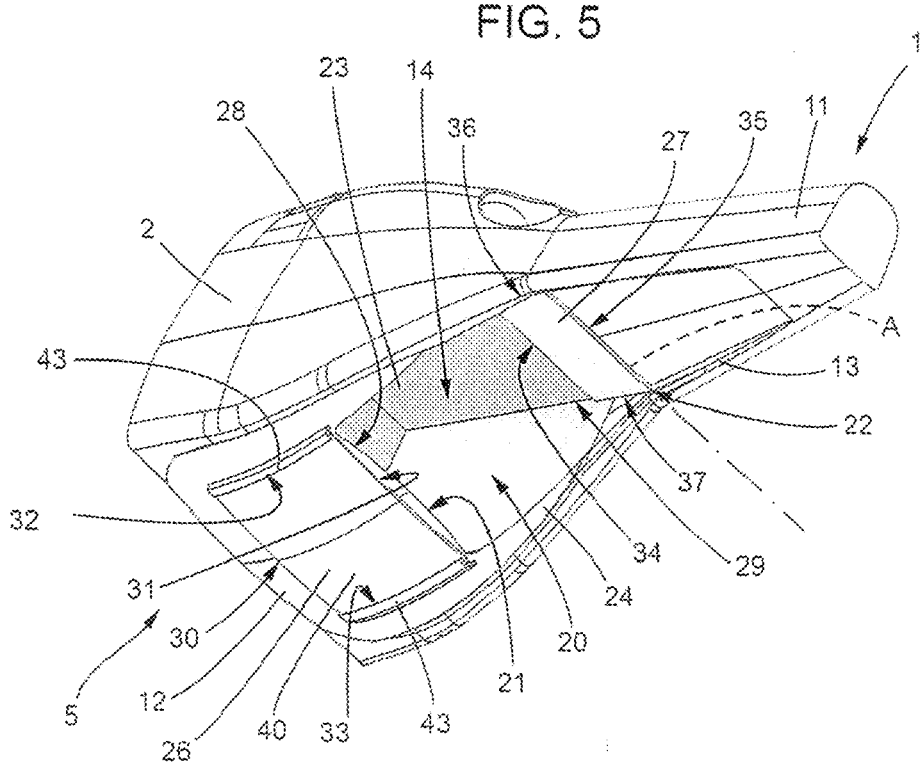

Whereas, when wall 26 is in the open position, edge 31 is adjacent to edge 21 of loading opening 20 and on the opposite side of edge 21 with respect to edge 22, and edge 30 is on the opposite side of edge 21 with respect to edge 22 (FIG. 5).

More specifically, when wall 26 is in the open position, edges 30 and 31 are interposed between nose 3 and edge 21 of loading opening 20.

Figure 4:
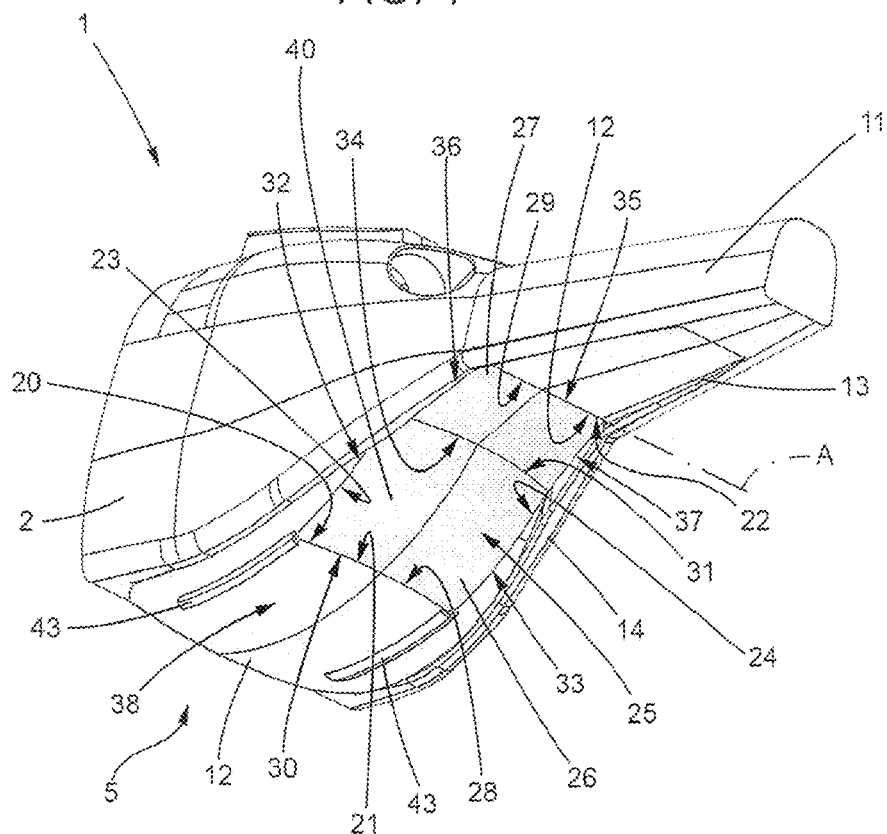
FIGS. 4 and 5 show rear underside views in perspective of the FIGS. 2 and 3 rear hatch in the closed position and open position respectively.

Outer surface 38 is fitted with two parallel runners 43 defining respective grooves engaged by edges 32, 33 of wall 26 as it slides between the closed and open positions (FIGS. 4 and 5).

Wall 27 is bounded by two opposite edges 34, 35, and by two opposite edges 36, 37 extending between respective ends of edges 34, 35.

Edge 35 is hinged to a front end of tail beam 13 about a horizontal axis A. More specifically, when wall 27 swings from the closed to the open position (FIGS. 2 and 3), edge 34 rotates clockwise with respect to axis A and inwards of cabin 8.

In the example shown (FIGS. 2 and 3), the helicopter comprises a variable-length actuator 45 comprising a first and a second member 46, 47, which have respective first ends fixed respectively to the tail portion 11 and to a face 48 of wall 27 facing inwards of cabin 8, and respective second ends opposite the first ends and connected telescopically to each other. More specifically, actuator 45 is of maximum and minimum length when wall 27 is in the closed and open position respectively.

Operation of the helicopter will now be described as of the condition (shown in FIGS. 1, 2 and 4) in which the helicopter is grounded, and walls 26, 27 are both in their closed positions closing loading opening 20 of cabin 8.

To load a stretcher and/or other material into cabin 8 through loading opening 20, actuator 45 is operated to rotate wall 27 clockwise about axis A into the open position (FIGS. 3 and 5) allowing free access to portion 29 of loading opening 20.

The operator then pushes edge 31 of wall 26 down by hand to slide wall 26 with respect to edge 21 and in the opposite direction to edge 22.

As it slides, edges 32 and 33 of wall 26 are guided by runners 43.

When pushed manually by the operator, wall 26 slides into the open position (FIGS. 2 and 4) to also allow free access to portion 28 of loading opening 20.

In the open position, wall 26 is positioned completely facing outer surface 38 of main portion 5 of fuselage 2.

More specifically, the convex curvature of face 40 and the concave curvature of face 41 mate with the convex curvature of outer surface 38.

The loading area in front of loading opening 20 is thus completely clear of wall 27.

And the stretcher and/or other material can be loaded easily into cabin 8 through loading opening 20.

Figure 2:
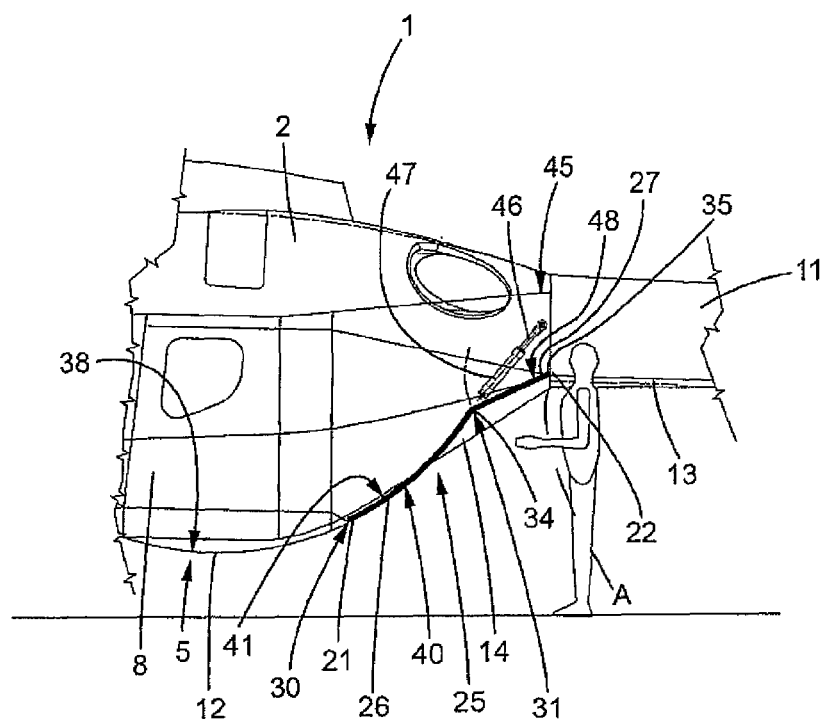
FIGS. 2 and 3 show side views of a rear hatch of a helicopter in, respectively, a closed position engaging a rear opening of the helicopter, and an open position allowing free access to the rear opening.
Figure 3:
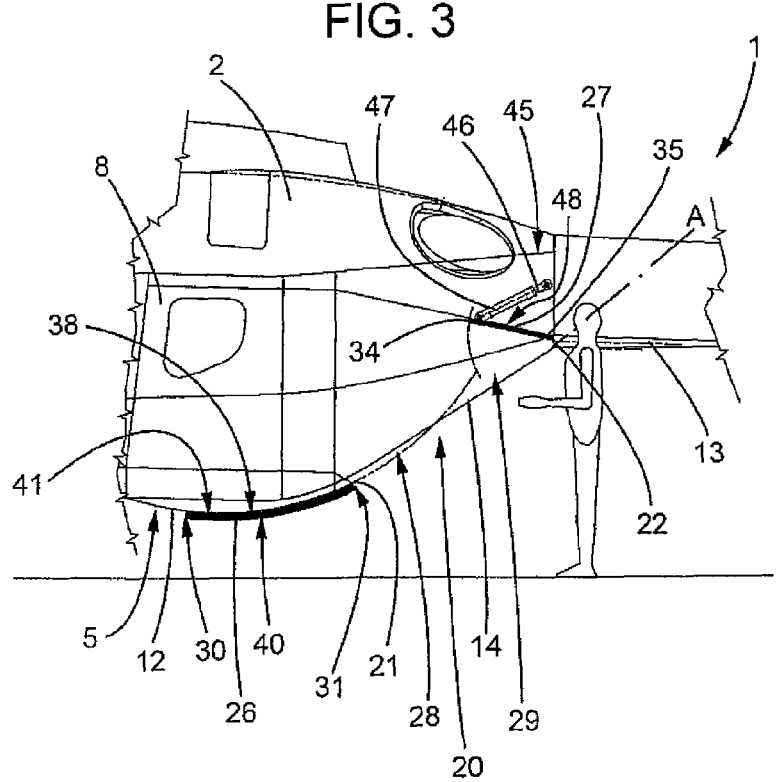

Once the loading operation is completed, wall 26 is slid manually back into the closed position, and actuator 45 is operated to swing wall 27 back into the closed position (FIGS. 2 and 4).

The advantages of aircraft 1 according to the present invention will be clear from the above description.

In particular, in the open position, wall 26 extends on the opposite side of edge 21 with respect to edge 22.

The area in front of loading opening 20 is therefore completely clear of wall 26 in the open position, thus making it much easier to load/unload stretchers and/or freight, particularly when main rotor 4 is running.

Moreover, wall 27 is hinged to tail beam 13 and housed inside cabin 8 in the open position.

As a result, the area in front of loading opening 20 is also completely clear of wall 27, thus making it even easier to load/unload stretchers and/or other material in and out of cabin 8 through loading opening 20.

The above advantages of the present invention obviously also apply regardless of whether aircraft 1 is a helicopter or a convertiplane.

Clearly, changes may be made to aircraft 1 without, however, departing from the scope of the present invention.

In particular, the sliding movement of wall 26 may be controlled by an electric or hydraulic actuator.

The invention claimed is:

1. An aircraft capable of hovering, and comprising:
   a fuselage in turn comprising a nose, a tail portion at the opposite end to said nose, and a cabin interposed between said nose and said tail portion; said cabin comprising a rear loading opening interposed between said nose and said tail portion, defining the cabin on the opposite side to the nose and delimited by a bottom edge and a top edge, opposite said bottom edge; and
   at least a first wall movable between a closed position engaging at least one portion of said loading opening, and an open position allowing free access to said portion of said loading opening;
   characterized in that, proceeding from the tail portion towards the nose, said first wall in said open position extends on the opposite side of said bottom edge of said loading opening with respect to said top edge, and is interposed between the nose and said bottom edge.

2. An aircraft as claimed in claim 1, characterized in that, in said open position, said first wall at least partly faces a surface of said fuselage bounding the outside of said cabin and defining said bottom edge.

3. An aircraft as claimed in claim 1, characterized in that said first wall slides with respect to said bottom edge between said closed and open positions.

4. An aircraft as claimed in claim 1, characterized in that said bottom and top edge define said loading opening on the side facing said nose and on the side facing said tail portion respectively.

5. An aircraft as claimed in claim 2, characterized in that said first wall comprises a curved convex first face facing outwards of said cabin; and in that said surface is convex; the curvatures of said first face and said surface matching at all points.

6. An aircraft as claimed in claim 5, characterized in that said first wall comprises a curved, concave second face opposite said first face and facing said cabin; the concavity of said second face housing at least part of said surface.

7. An aircraft as claimed in claim 2, characterized by comprising guide means fitted to said surface and for guiding said first wall.

8. An aircraft as claimed in claim 1, characterized by comprising a second wall movable, with respect to said top edge, between a further closed position engaging a further portion of said loading opening, and a further open position, in which it allows free access to said further portion of said loading opening, and is housed inside said cabin.

9. An aircraft as claimed in claim 8, characterized in that said second wall is hinged to a supporting beam of said tail portion of the aircraft.

10. An aircraft as claimed in claim 1, characterized by comprising an access opening to said cabin, defined by a side of said fuselage alongside said loading opening.

11. An aircraft as claimed in claim 1, characterized in that said fuselage comprises a main portion interposed between said nose and said tail portion; said main portion comprising a first region which supports said cabin and defines said surface, and a second region which is interposed between said first region and said tail portion, slopes with respect to the first region, and defines said loading opening.

12. An aircraft as claimed in claim 1, characterized by being a helicopter.

13. An aircraft as claimed in claim 1, characterized by being a convertiplane.

* * * * *